(12) United States Patent
Celina

(10) Patent No.: US 8,003,730 B1
(45) Date of Patent: Aug. 23, 2011

(54) PROCESS FOR EPOXY FOAM PRODUCTION

(75) Inventor: Mathias C. Celina, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 244 days.

(21) Appl. No.: 12/335,925

(22) Filed: Dec. 16, 2008

(51) Int. Cl.
*C08G 65/38* (2006.01)
*C08J 9/00* (2006.01)

(52) U.S. Cl. ........ 525/128; 525/130; 525/178; 525/180; 525/191

(58) Field of Classification Search ............... 521/128, 521/130, 178, 180, 191
See application file for complete search history.

(56) References Cited

U.S. PATENT DOCUMENTS

| | | | | |
|---|---|---|---|---|
| 3,977,996 A | * | 8/1976 | Katzakian et al. | 502/167 |
| 4,097,465 A | * | 6/1978 | Berger | 528/297 |
| 4,125,488 A | * | 11/1978 | Hill et al. | 521/128 |
| 4,346,207 A | * | 8/1982 | Maurer et al. | 528/103 |
| 4,990,543 A | | 2/1991 | Wernsing et al. | |
| 5,112,926 A | * | 5/1992 | Lee et al. | 525/526 |
| 5,120,771 A | | 6/1992 | Walmsley | |
| H1734 H | * | 6/1998 | Masse | 521/128 |
| 5,990,224 A | | 11/1999 | Reynolds et al. | |
| 6,031,012 A | | 2/2000 | Nakanishi et al. | |
| 6,825,315 B2 | | 11/2004 | Aubert | |

FOREIGN PATENT DOCUMENTS

DE 1570607 * 9/1969

OTHER PUBLICATIONS

Celina M., Novel foaming processes using CO2 generation from anhydride precursors. Polymer Preprints (American Chemical Society, Division of Polymer Chemistry) 2008;49-767.

* cited by examiner

*Primary Examiner* — Irina S Zemel
(74) *Attorney, Agent, or Firm* — Elmer A. Klavetter; Kevin W. Bieg

(57) ABSTRACT

An epoxy resin mixture with at least one epoxy resin of between approximately 60 wt % and 90 wt %, a maleic anhydride of between approximately 1 wt % and approximately 30 wt %, and an imidazole catalyst of less than approximately 2 wt % where the resin mixture is formed from at least one epoxy resin with a 1-30 wt % maleic anhydride compound and an imidazole catalyst at a temperature sufficient to keep the maleic anhydride compound molten, the resin mixture reacting to form a foaming resin which can then be cured at a temperature greater than 50° C. to form an epoxy foam.

15 Claims, 2 Drawing Sheets

PROCESS FOR EPOXY FOAM PRODUCTION

This invention was made with Government support under Contract No. DE-AC04-94AL85000 awarded by the Department of Energy. The Government has certain rights in the invention.

BACKGROUND OF THE INVENTION

The invention relates to foamed epoxies, and more particularly, to foamed epoxies prepared using an anhydride additive in the presence of a tertiary amine catalyst.

Foamed epoxies are normally produced via addition of physical blowing agents such as inorganic compounds that thermally decompose at low temperatures and produce gases, or via addition of low volatile liquids, such as freons or similar fluorinert compounds, that also result in gas formation during the exothermic epoxy cure. In comparison, polyurethanes are commonly cured using an in-situ chemical side reaction that produces gaseous $CO_2$ during the cure reactions. This reaction is specific to the properties of isocyanates, the key molecular building block of polyurethanes. Due to the completely different type of epoxy curing reaction, an in-situ chemical foaming process similar to the standard and widely used polyurethane foaming reactions and process has so far not been described in the literature.

DESCRIPTION OF SPECIFIC EMBODIMENTS

Figure 1:
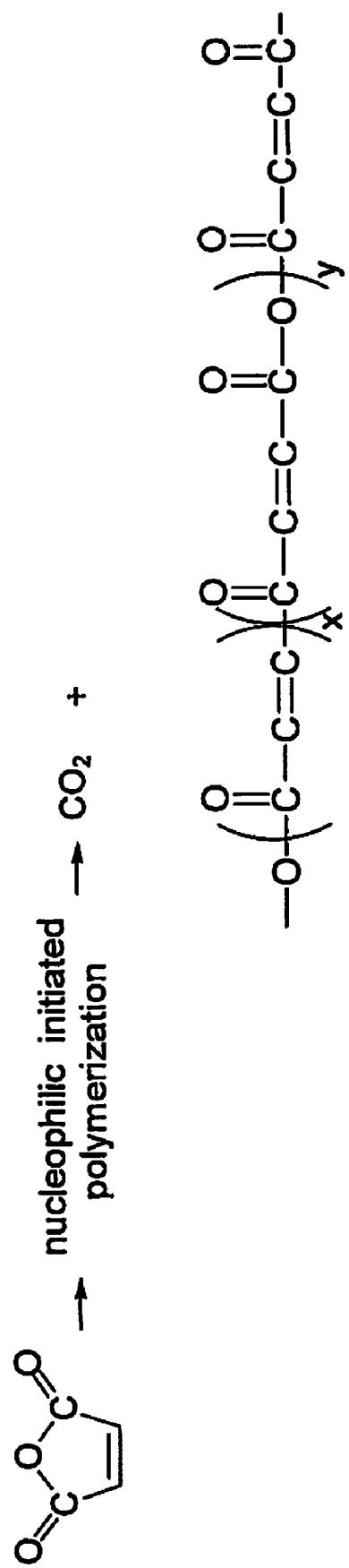
FIG. 1 shows the polymerization scheme for maleic anhydride.

The present invention describes an alternative method for the production of foamed epoxy materials. Although foamed epoxies are normally produced using physical blowing agents such as inorganic compounds that thermally decompose at low temperatures and produce gases, or via addition of low volatile liquids, such as freons or similar flourinert compounds, that also result in gas formation during the exothermic epoxy cure, the method of the present invention utilizes an anhydride additive (such as maleic anhydride) that acts as a co-curing agent and self-polymerizable additive for the production of epoxy foams. Maleic anhydride reactions under anionic (nucleophilic) initiating conditions involve various intermediates, oligomers with terminal carboxylate groups. These intermediates are unstable and, similarly to carbamic acids formed from isocyanates and water in polyurethanes, have a tendency to cleave off gaseous $CO_2$. Under suitable chemical conditions, maleic anhydride has the ability to produce $CO_2$ in significant quantities while it polymerizes (see FIG. 1). Because maleic anhydride is also suitable as a curing agent for epoxies, the use of maleic anhydride can polymerize, produce $CO_2$ and be integrated into epoxy network formation via anhydride curing to produce foamed epoxy materials. These maleic anhydride reactions which produce gaseous $CO_2$ as a by-product occur from room temperature to elevated temperatures of 100° C. or higher.

Figure 2:
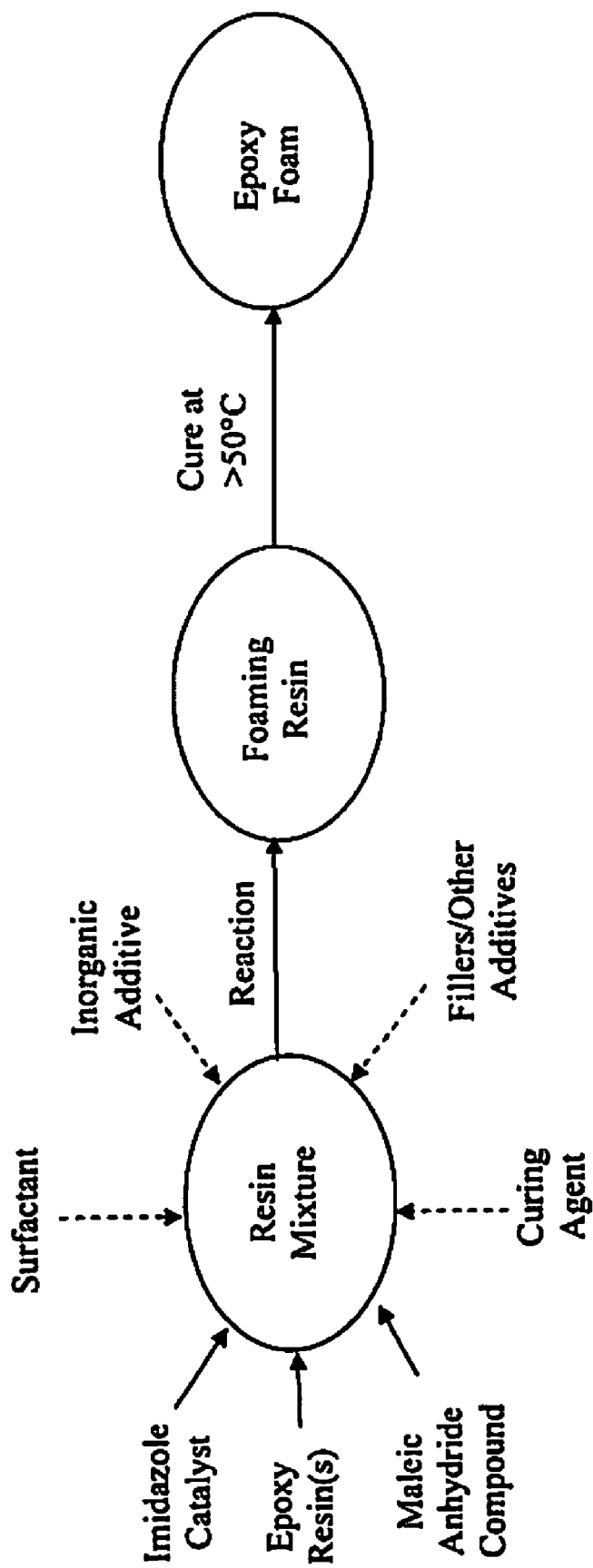
FIG. 2 illustrates the general method of the present invention.

FIG. 2 illustrates one general embodiment of the method of the present invention wherein a resin mixture is formed by adding at least one epoxy resin with a maleic anhydride compound and an imidazole catalyst at a temperature sufficiently high to make the maleic anhydride compound molten or liquid. The mixture constituents react to form a foaming resin which can subsequently be cured to form an epoxy foam. For the method of the present invention, a maleic anhydride compound can be maleic anhydride or derivative compound thereof, such as citraconic anhydride (methyl substituted maleic anhydride). For the method of the present invention, an imidazole catalyst is an imidazole compound with a substitution group on the tertiary nitrogen (that is, the hydrogen must be substituted with a methyl or other similar group). In one embodiment, the catalyst is 1-methyl imidazole. Other additives can be optionally added to control the reaction process as well as physical and chemical properties of the resulting foam. Traditional surfactants are used as additives to enable controlled and homogenous foam formation. Curing agents can be added as well as compounds to control the viscosity of the mixture or physical properties of the resultant foam. This maleic anhydride-based foaming process can also be conducted in the presence of other additives and compounds, resulting in foamed hybrid materials.

The present invention also provides for a resin mixture composition prior to curing as an epoxy foam comprising at least one epoxy resin of between approximately 60 wt % and 90 wt %, a maleic anhydride of between approximately 1 wt % and approximately 30 wt %, and an imidazole catalyst of less than approximately 2 wt %.

In one embodiment, various epoxy resins and epoxy systems with traditional curing agents (such as commonly used phthalic anhydrides and its derivatives) were polymerized with low amounts of nucleophilic initiators (anionic cure) and surfactants in the presence of maleic anhydride at temperatures from room temperature to 100° C. The maleic anhydride was incorporated into the cured material via direct integration into the epoxy network and self-polymerization resulting in partial $CO_2$ liberation. The resulting cured glassy materials are chemically foamed epoxies with a large range of physical densities available, depending on concentrations of maleic anhydride, initiators, surfactants and reaction temperatures. Excellent foams can be obtained at very reasonable curing temperatures of 50-80° C.

A catalyst is added to initiate polymerization of maleic anhydride or its derivative which will lead to some polymerization (higher molecular weight material) and concurrent $CO_2$ generation. The catalyst simultaneously also initiates polymerization of the epoxy resin and the cure of the epoxy with extra anhydride material, like in traditional epoxy-anhydride systems. Both reactions will lead to an increase in molecular weight and resin solidification. Mechanical properties and foam densities can be easily varied and adjusted as a function of the basic resin viscosity and functionality, and anhydride addition as well as catalytic levels and pre-warm/cure temperature affecting foaming and cure kinetics.

In one embodiment of the method of the present invention, an epoxy base resin of suitable viscosity to allow for mixing and initial foam stability is mixed with maleic anhydride or anhydride derivative thereof at a temperature sufficient to allow mixing (that is, a temperature sufficient to make the maleic anhydride or derivative thereof molten) to make a warmed resin mixture. A catalyst comprising an imidazole compound or derivative thereof can be added either during this mixing process or after the formation of the warmed resin mixture. A nucleophilic polymerization reaction of the maleic anhydride occurs during which $CO_2$ evolves to foam the resin. The foaming resin is cured at elevated temperature to form a cured epoxy foam.

Maleic anhydride is unique in its structure as an acid anhydride as it combines a single unsaturation (double bond) and the acid anhydride structure in the smallest molecule possible. A derivative of maleic anhydride is citraconic anhydride (methyl substituted maleic anhydride). Both maleic anhydride and the methyl-substituted maleic anhydride have been used with a concentration of between 1 and 50 wt % in the method of the present invention to form a cured epoxy foam. Compared with the use of pure maleic anhydride, the use of methyl-substituted maleic anhydride forms a foam of similar behavior but the gas yield is somewhat lower due to a slightly higher molecular weight per reactive acid anhydride group.

Maleic anhydride or its methyl substituted derivative can thus be used as a reagent to induce its partial decomposition and deliver gaseous $CO_2$ in sufficient and rapid yield to act as a foaming agent. In one embodiment, this foaming reaction is coupled with curable epoxy or other suitable reactive and curable resin mixes to result in the production of solid cured foams of varying density. As an advantage of using maleic anhydride or its derivative, the gas generation and foaming is coupled with some intrinsic polymerization or curing leading to early foam stability via an increase in resin viscosity. This behavior is reminiscent of the early gelation of multifunctional isocyanate reagents in polyurethane foams via amine isocyanate reactions after $CO_2$ cleavage.

Aromatic acid anhydrides may appear to be similar to maleic anhydride, but the individual double bond in proximity to the acid anhydride in maleic anhydride appears to much better facilitate an alternating vinylketone stabilized intermediate that is amenable to cleaving off $CO_2$ from the polymerizing maleic anhydride and propagates an anionic chain reaction. Test results have shown that, in contrast to the method of the present invention using maleic anhydride, $CO_2$ is not cleaved from aromatic acid anhydrides in sufficient quantities, likely due to the fact of a ring opening polymerization anion being delocalized along the aromatic ring and perhaps resulting in much weaker propagation tendencies.

Epoxy foams are formed by cross-linking reactions between epoxy resins and curing agents that create a three-dimensional covalent bond network. There are numerous commercially available epoxy resins and curing agents that are used to achieve epoxy foams with different thermal, mechanical, and electrical properties. A type of epoxy resin that is commonly used is diglycidyl ether of bisphenol A (DGEBPA); another common type of epoxy resin is a phenolic novolac material. In general, these are cured with various amines and in higher performance materials with aromatic or aliphatic acid anhydrides. Examples of these are: the solid Epon 1001, Epon 1002, Epon 1004, Epon 1007, Epon 1009, Epon 1031 and Epon SU-8; and the liquid, Epon 160, Epon 161, Epon 154, Epon 826, Epon 828, Epon 830, Epon SU-2.5, Epon SU-3 manufactured by Hexion (previously Shell Chemical Corporation; EN439, DER331, and similar materials manufactured by Dow Chemical. Other materials may be Epalloy® and Erisys® epoxies from the CVC Specialty Chemicals, Inc. resin company and pure Araldite® resins (Huntsman Corporation advanced materials). Also, the following epoxy resins may be used: the solid ERL-2002, 2003 and 3001 and the liquid ERL 2772, 2774 and 3794 manufactured by Bakelite Co. of the Union Carbide Plastics Division. Any epoxy resin that is comparable to the above listed epoxy resins may be used regardless of the manufacturer. Resins can be easily mixed to result in a suitable viscosity and reactivity range (epoxy equivalent reactivity by resin weight value).

Acid anhydride curing agents commonly used are tetrahydro phthalic anhydride (THPA), methyl-tetrahydro phthalic anhydride (MTHPA), hexahydro phthalic anhydride (HHPA), methyl-hexahydro phthalic anhydride (MTHPA), Nadic methyl anhydride (NA), phthalic anhydride (PA) or derivatives like methylphthalic anhydride (MPA) and can be added as desired, generally at concentrations less than 60 wt %. Also higher melting point aromatic acid anhydrides like benzophenonetetracarboxylic dianhydride (BTDA), pyromellitic acid anhydride, or similar compounds. Smaller aliphatic anhydrides are less commonly used. Maleic anhydride has been used as a cure additive or cure agent but not as a foaming agent.

Surfactants are used in epoxy foams to promote foaming and stabilization of the subsequent cellular structure. A surfactant generally serves to decrease the surface tension of the pre-cure composition and thereby promote increased expansion, smaller cells, and more uniform cell size and texture of the expanded formed product. The surfactants used in polyurethane foam systems, such as silicone-based surfactants, are the same ones generally used in epoxy foams. The cell structure can be greatly affected by the surfactant, which in turn influences the properties of the resultant foam.

In various embodiments, anionic, cationic and non-ionic types of surfactants can be used, with the latter being the more commonly applied compounds in organic foams. Of hundreds of available commercial surfactants, many surfactants will foam well during early rise of the foam but for extended cure times can lead to foam contraction or even foam collapse as they can commence partially acting as defoamers. In another embodiment, even without a surfactant, some suitable foams can be obtained. Their structure will in general be coarser than those foams produced with a surfactant. Finer cells can be achieved with the help of surfactants. Many non-ionic based surfactants and some types normally used in polyurethane foams were evaluated and work in the foam system of the present invention. Suitable surfactants, include but are not limited to, Shin-Etsu KF-105 (modified organo polysiloxane), Stepan G3300 (amine alkylbenzene sulfonate), Cedepal CO-210 (alkyl phenol ethoxylate), or Polystep F-5 (>95% nonionic alkoxylate-polyethylene glycol mono(nonyl phenyl)ether. Some are silicone based or poly ethyleneoxide block non-ionic surfactants. A variety of surfactants can be used to provide sufficient performance, generally added at a concentration of less than approximately 2 wt %.

In principle most tertiary amines, aliphatic or aromatic based will accelerate many types of epoxy cure reactions. This is one reason that epoxy amine systems are generally the fastest epoxy systems. An epoxy anhydride system can be accelerated and efficiently cured with for example a low concentration of dimethyloctylamine, piperazine, imidazol derivatives or with many other amines possessing polymerization initiating nucleophilic character. It was initially assumed that maleic anhydride or its derivative could be polymerized easily using many similar amines and perhaps be triggered to homopolymerize with $CO_2$ elimination. However, for the maleic anhydride dissolved in an epoxy resin, most amines will exclusively accelerate the acid anhydride based cure with the epoxy; most amines trigger the classic reaction to form a crosslinked polyester (the addition product of epoxy groups to acid anhydrides) as proceeding in every acid anhydride epoxy formulation. Nearly all of the common amine catalysts examined failed to induce the maleic anhydride or methyl-substituted maleic anhydride polymerization associated with $CO_2$ formation that is part of the method of the present invention. Air Products as a company specializes in the marketing of various foaming catalysts, predominantly amine based and supplied to foam manufacturing as a full range of foaming and crosslinking catalysts. None of the commercial catalysts such as DABCO T-12, DABCO TMR, DABCO TMR-3, POLYCAT SA-102, DABCO T12, POLY- CAT 26, DABCO MB20, POLYCAT 41, DABCO Crystalline, DABCO BL-17, DABCO BL-19, DABCO 33 LV, or CUREZOL 2E4MZ in commonly used quantities of 1% were found capable of producing maleic anhydride based epoxy foams described in this invention. Most of these catalysts accelerated the epoxy anhydride cure but failed to produce $CO_2$ for foaming.

Testing showed that 1-methyl imidazole is a tertiary amine catalyst that is unique in its effectiveness to catalyze the maleic anhydride to polymerize and produce $CO_2$ and also accelerate the matrix cure. This is apparently related to the small size of this molecule, not just its basicity, but its strong hard nucleophilic character. Other catalysts exist that display strong nucleophilic character in a highly mobile small molecule with an exposed unbonded nitrogen electron pair include N-substituted pyrimidines. Similarly, crown ethers with dissolved alkali hydroxides possess free OH" that may be an attractive nucleophile. Interestingly, even related imidazole derivatives like 2-ethyl 4-methyl imidazole did not act as suitable catalysts, likely because of the non-substituted 1-nitrogen. It appears that at minimum the 1-nitrogen in the imidazole must be hydrogen free; that is methyl substituted or similar. Indications are that any available hydrogen transfer reaction can interfere with the maleic anhydride polymerization propagation and thereby preventing $CO_2$ elimination.

In another embodiment, the basic epoxy foam can be modified with the addition of various curable anhydrides (commonly used are tetrahydro phthalic anhydride (THPA), methyl-tetrahydro phthalic anhydride (MTHPA), hexahydro phthalic anhydride (HHPA), methyl-hexahydro phthalic anhydride (MHHPA), Nadic methyl anhydride (NA), phthalic anhydride (PA) or derivatives like methylphthalic anhydride (MPA)) to achieve variations in toughness and other mechanical properties. Similarly, other reactive resins such as cyanate esters or isocyanates can be added to help in further crosslinking and hybrid cure network formation. Such reactive compounds will affect viscosity and cure features. Inorganic additives using clays, wollastonite, mica and the whole range of commonly-used fillers can be incorporated, again with the aim of tuning mechanical properties, hardness, char behavior, thermal properties or related features. The limits to this system is found in any amine curatives, as anhydrides and amines will quickly react to form amides/imides and water and are therefore unsuitable to be used in the method of the present invention.

In one embodiment, an epoxy base resin of suitable viscosity to allow for mixing and initial foam stability is mixed with approximately 1-30% of maleic anhydride at a temperature sufficient to allow mixing (that is, at a temperature sufficiently high to keep the maleic anhydride molten, such as above approximately 55° C.) and also mixed with a catalyst with optionally 0-2% of a suitable surfactant added to promote a finer, more stable, foam structure. One catalyst material is comprised of 1-methyl imidazole. When the catalyst is mixed, $CO_2$ will evolve and foam the resin. The rising foam is cured at elevated temperature, generally in the range of 50-100° C.

In one embodiment, 100 parts of the resin Epon 154 or Epon 1050 was mixed with 15 pph maleic anhydride as a warm liquid with the addition of 0.5% silicone-based surfactant such as KF-105 (manufactured by Shin-Etsu Chemical Co., Ltd.) or G3300, an alkyl aryl sulfonate amine salt (a 90% active amine salt of an alkylbenzene sulfonic acid) manufactured by Stepan Company. Approximately 0.5-2% of 1-methyl imidazole was added as a catalyst and the resulting rising foam put in an oven and cured at 75° C.

EXAMPLES

In all of the examples and embodiments presented herein, the temperatures and concentrations are approximate, rounded to the nearest significant figure.

Example 1

Foamed Epoxy with No Additives

In one embodiment, 100 parts of Epon 154 was preheated to 65° C. and added to 15 pph (parts per total resin mixture) of maleic anhydride where the maleic anhydride was maintained as a warm liquid. In this embodiment, a temperature of 65° C. was maintained. 1.2 pph of 1-methyl imidazole catalyst was added. A foaming resin was produced and cured at 75° C. for approximately 24 hrs. In another embodiment, 100 parts of Epon 1050 were used.

Example 2

Foamed Epoxy with Surfactant Additive

In one embodiment, 100 parts of Epon 154 was preheated to 65° C. and added to 25 pph (parts per total resin mixture) of maleic anhydride where the maleic anhydride was maintained as a warm liquid. In this embodiment, a temperature of 65° C. was maintained. 0.5% of a silicone-based surfactant, Shin-Etsu KF-105 was added as was 0.75% pph of 1-methyl imidazole catalyst. A foaming resin was produced and cured at 65° C. for approximately 24 hrs. In another embodiment, 100 parts of Epon 1050 were used.

Example 3

Foamed Epoxy with Surfactant and Curing Additive

In one embodiment, 100 parts of Epon 154 was preheated to 65° C. and added to 15 pph (parts per total resin mixture) of maleic anhydride where the maleic anhydride was maintained as a warm liquid. In this embodiment, a temperature of 65° C. was maintained. 20 pph of methyl-tetrahydro phthalic anhydride (MTHPA) was added as was 0.5% Stepan PolyStep F5 surfactant and 1.2 pph of 1-methyl imidazole catalyst. A foaming resin was produced and cured at 75° C. for approximately 24 hrs. In another embodiment, 100 parts of Epon 1050 were used.

Example 4

Foamed Epoxy with Additives

In one embodiment, 100 parts of Epon 154 was preheated to 65° C. and added to 15 pph (parts per total resin mixture) of maleic anhydride where the maleic anhydride was maintained as a warm liquid. In this embodiment, a temperature of 65° C. was maintained. 0.5% of a silicone-based surfactant, Shin-Etsu KF-105 was added as was 10 pph Hexion epoxy modifier Heloxy 62 (a viscosity reducer) and 1.2 pph of 1-methyl imidazole catalyst. A foaming resin was produced and cured at 75° C. for approximately 24 hrs. In another embodiment, 100 parts of Epon 1050 were used.

Example 5

Foamed Epoxy with Multiple Epoxy Resins and Additives

In one embodiment, 50 parts of Epon 154 and 50 parts Epon 161 (a lower viscosity epoxy resin) were preheated to 65° C. and added to 15 pph (parts per total resin mixture) of maleic anhydride where the maleic anhydride was maintained as a warm liquid. In this embodiment, a temperature of 65° C. was maintained. 20 pph methyl-tetrahydrophthalic anhydride, 50 pph Vanderbilt Peerless kaolin clay, and 0.5% Stepan Polystep F5 surfactant were added as was 1.2 pph of 1-methyl imidazole catalyst. A foaming resin was produced and cured at 75° C. for approximately 24 hrs.

Example 6

Foamed Epoxy with No Additives and 2 pph Catalyst

In one embodiment, 100 parts of Epon 154 was preheated to 65° C. and added to 25 pph (parts per total resin mixture) of maleic anhydride where the maleic anhydride was maintained as a warm liquid. In this embodiment, a temperature of 65° C. was maintained. 2 pph of 1-methyl imidazole catalyst was added. A foaming resin was produced but, because of the increased concentration of some of the reactants, the mixture over-reacted. In another embodiment, 100 parts of Epon 1050 were used.

Example 7

Foamed Epoxy with No Additives and Lower Concentrations of Maleic Anhydride and Catalyst In one embodiment, 100 parts of Epon 154 was preheated to 65° C. and added to 10 pph (parts per total resin mixture) of maleic anhydride where the maleic anhydride was maintained as a warm liquid. In this embodiment, a temperature of 65° C. was maintained. 1 pph of 1-methyl imidazole catalyst was added. A foaming resin was produced but was a mechanically weaker foam due to the reduction in concentration of some of the reactants. In another embodiment, 100 parts of Epon 1050 were used.

Although the invention has been described with reference to one or more particular embodiments, this description is not meant to be construed in a limiting sense. Various modifications of the disclosed embodiments as well as alternative embodiments of the invention will become apparent to persons skilled in the art. It is therefore contemplated that the appended claims will cover any such modification or embodiments that fall within the scope of the invention. The entire disclosures of all references, applications, patents and publications cited above are hereby incorporated by reference.

I claim:

1. A method of making an epoxy foam, comprising:
   forming a resin mixture of at least one epoxy resin with a 1-50 wt % maleic anhydride compound and an imidazole catalyst at a temperature sufficient to keep said maleic anhydride compound molten and wherein a surfactant is added to said resin mixture, said resin mixture reacting to form a foaming resin; and curing said foaming resin at a temperature greater than 50° C. to form an epoxy foam.

2. The method of claim 1 wherein said imidazole catalyst is 1-methyl imidazole.

3. The method of claim 2 wherein said imidazole catalyst is added at a concentration of between approximately 0.3 wt % and approximately 2 wt %.

4. The method of claim 1 wherein said maleic anhydride compound is selected from maleic anhydride and citraconic anhydride.

5. The method of claim 1 wherein said at least one epoxy resin is selected from a diglycidyl ether of bisphenol A compound, and a phenolic novolac compound.

6. The method of claim 1 wherein said at least one epoxy resin is selected from a resin with a terminal reactive epoxy group.

7. The method of claim 1 wherein said surfactant is added at a concentration less than approximately 2 wt %.

8. The method of claim 1 wherein said surfactant is selected from an anionic surfactant, a cationic surfactant and a nonionic surfactant.

9. The method of claim 1 wherein said surfactant is selected from an organo polysiloxane compound, an amine alkylbenzene sulfonate compound, an alkyl phenol ethoxylate compound, a silicone-based non-ionic compound, a poly ethyleneoxide block non-ionic compound, and a nonionic alkoxylate-polyethylene glycol mono(nonyl phenyl)ether compound.

10. The method of claim 1 wherein a curing agent is added to said resin mixture.

11. The method of claim 10 wherein said curing agent is added at a concentration less than approximately 60 wt %.

12. The method of claim 10 wherein said curing agent is selected from tetrahydro phthalic anhydride, methyl-tetrahydro phthalic anhydride, hexahydro phthalic anhydride, methyl-hexahydro phthalic anhydride, Nadic methyl anhydride, phthalic anhydride, methylphthalic anhydride, benzophenonetetracarboxylic dianhydride, and pyromellitic acid anhydride.

13. The method of claim 1 wherein an inorganic additive is added to said resin mixture to control a property selected from a mechanical property, foam hardness, foam char behavior and foam thermal property.

14. The method of claim 13 wherein said inorganic additive is selected from a clay, wollastonite, and mica.

15. An epoxy resin mixture comprising at least one epoxy resin of between approximately 60 wt % and 90 wt %, a maleic anhydride of between approximately 1 wt % and approximately 30 wt %, a surfactant and an imidazole catalyst of less than approximately 2 wt %.

* * * * *